Jan. 9, 1940.   H. B. DENMAN   2,186,284
CORK COMPOSITION
Filed June 15, 1935

Inventor
Harry B. Denman.
By
Attorneys

Patented Jan. 9, 1940

2,186,284

UNITED STATES PATENT OFFICE 2,186,284

CORK COMPOSITION

Harry B. Denman, Detroit, Mich., assignor to Detroit Gasket & Mfg. Co., Detroit, Mich., a corporation of Michigan Application June 15, 1935, Serial No. 26,823

2 Claims. (Cl. 288—1)

The present invention relates to an improved composition consisting of a body material such as comminuted cork, or fibres, namely asbestos fibres or paper-like fibres, or mixtures of the same, and a rubber-like binder of the olefin polysulphide reaction product type. This binder is known commercially as "Thiokol" and is described and its method of preparation set forth in various patents granted to one Joseph C. Patrick.

Particularly, the invention is useful as a gasket material by reason of its resistance to oils and other organic solvents, such as benzene, gasoline and naphtha. In addition, the binder is tough, flexible and resilient and is also resistant to the action of water, moisture and gases. In other words, a gasket constructed in accordance with the present invention is excellent for use in connection with internal combustion engines.

A very convenient and practical method of preparing the composition and gaskets therefrom consists in breaking down the Thiokol to which has been added a suitable accelerator in a standard mixing mill or in an internal mixer for approximately ten minutes. Thereafter, if desired, toughening agents such as zinc oxide or gas black or both may be added and a softening agent such as stearic acid may be incorporated if desired. Also, there is added a body material which may be comminuted cork, asbestos fibres, paper pulp or disintegrated paper. The mixing of the several constituents takes place until all are thoroughly incorporated. The material is then sheeted out on a standard calender to the desired thickness. If desired, the sheeted material may then be vulcanized or it may be placed in a mold or wrapped on a drum and vulcanized.

In addition to the ingredients above mentioned, I may add true rubber, but since these materials are soluble and swell in the presence of organic solvents, they are preferably not employed where the material will encounter such conditions.

The final product may be either molded into various gasket shapes or gaskets may be suitably stamped or punched from the sheeted composition.

In addition to gaskets, articles of any desired shape, contour or size may be produced from either sheeted material or material molded to the proper configuration.

The following is a typical formula:

| | Pounds |
|---|---|
| Thiokol | 20 |
| Rubber accelerator (master batch and preferably including an appropriate amount of rubber) | 1 |
| Stearic acid | 0.1 |
| Zinc oxide | 2 |
| Gas black | 5 |
| Cork (comminuted) | 15 |

The amount of gas black may be varied to meet certain specified conditions and this is also true of the stearic acid and zinc oxide.

Sufficient accelerator will be employed to hasten the vulcanization of the Thiokol. Where rubber is also used, it is generally, but not necessarily, mixed with the accelerator. As will be appreciated, the accelerator and vulcanizing agent, e. g., sulphur, will be used in amount to produce the required bond and curing of the "Thiokol" or "Thiokol" and rubber.

Instead of comminuted cork, asbestos fibres, paper pulp or disintegrated paper may be substituted, or the body material may consist of comminuted cork and asbestos, asbestos and paper fibres or comminuted cork and paper fibres, or comminuted cork, asbestos and paper fibres. The term "paper fibres" is intended to include both paper pulp and disintegrated paper.

With the composition above described, the Thiokol and accelerators are broken down on the standard mixing mill or internal mixer for about ten minutes. Then the other materials are added until all are thoroughly incorporated. The material is then sheeted out on a standard calender at the desired thickness. The sheeted material is placed in a mold or wrapped on a drum and vulcanized for a definite time, e. g., forty minutes at 287° F. The time and temperature are, of course, varied to suit manufacturing conditions and the type of final product desired. Before removing the material from the mold or drum, it is cooled to prevent the formation of blisters.

The body material will preferably predominate by volume and the binder will be used in an amount sufficient to form a tough, resilient and flexible bond between the particles or fibres or particles and fibres. The bond is water and moisture resistant, gas proof and particularly is resistant to the solvent action of organic solvents.

Gaskets constructed from the composition of the present invention are useful in the automotive industry in that the gaskets retain their resilience and flexibility, and exert a high sealing quality notwithstanding they are continuously subjected to oils, hydrocarbon vapors as well as naphtha, benzene and gasoline.

Referring to the drawing.

Figure 1:
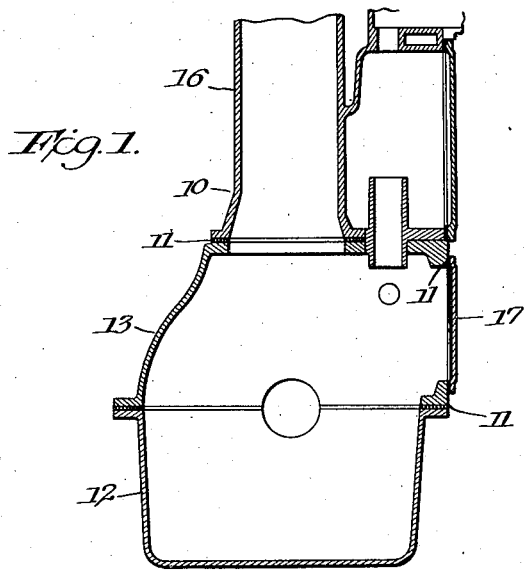
Figure 1 is a sectional view of an internal combustion engine.
Figure 2:
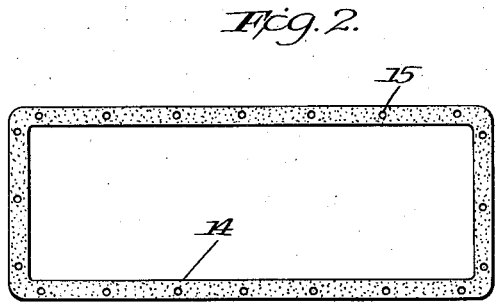
Figure 2 is a top elevation of a gasket employed between the upper and lower sections of the crank case of the internal combustion engine.
Figure 3:
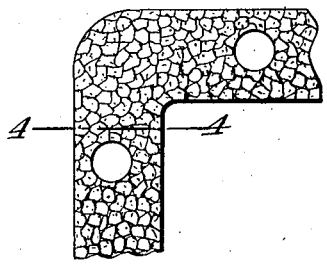
Figure 3 is an elevational view in detail broken away showing a gasket in which the body material consists of comminuted cork.
Figure 4:
Figure 4 is a sectional view on the line 4—4 of Figure 3.

The internal combustion engine 10 is provided with a gasket 11 in accordance with the present invention suitably secured between the upper and lower sections of the crank case 12 and 13 respectively. This gasket, as shown in Figure 2, will be provided with a port opening 14 and suitable holes 15 or other openings to receive the securing bolts or guides.

I have also shown a gasket 11 positioned between the cylinder 16 and the upper crank case section 13, as well as applied between the cover plate 17 and the upper half of the crank case 13.

It is to be understood that gaskets constructed from the material of this invention may have various forms and shapes to suit the joint with which the gasket is associated. Likewise, the gasket may have any desired thickness. Again, I construct a gasket after the manner disclosed in the patent to Balfe, No. 1,776,140. With such a construction, the cushion gasket material layers are preferably of asbestos fibres, but other of the body materials described herein and mixtures of the same are useful.

The gasket constructed in accordance with any of the forms of this invention may have a suitable non-sticking surface such as graphite and a coating film thereover such as silicate of soda.

I have referred herein to a binder consisting of an olefin polysulphide reaction product commercially known as Thiokol and sold by "The Thiokol Corporation, Yardville, New Jersey." Various types of rubber-like binders of the order of Thiokol and including an olefin polysulphide reaction product are employed and, for convenience, reference is had to the patents of Joseph C. Patrick, wherein the character of the product and its method of preparation may be readily ascertained. The binder, as stated, will include this rubber-like product known as Thiokol, together with a vulcanizing accelerating agent and toughening and softening agents such as gas black and zinc oxide. In addition, softening agents of the order of stearic acid are also used. In connection with these toughening and softening agents, it will be appreciated that they are conventional in the rubber manufacturing art and therefore the present invention is not limited to their use, since they may be omitted or various other equivalent materials likewise well known in the rubber art may be substituted therefor. In reciting the specific constituents of one satisfactory composition, this has been done for example only in that proportions of the constituents will be changed in accordance with the product required.

The plastic mixture of body material and binder may be formed into sheets, blocks, rolls and other varying forms and shapes and then vulcanized or a plastic vulcanized mixture may be formed and subsequently shaped.

The characteristics of the body material are preserved in the final product, e. g., the cork properties of resilience and flexibility are retained and enhanced by the binder. In this connection, of course, the proportion of body material to binder may be varied to control the character of the final product. However, it is preferred to make a product wherein the properties of the body material prevail and sufficient binder is used to form a tough, flexible and resilient bond between the cork particles and/or fibres.

The material, while particularly useful for sealing purposes, may be employed in various situations. The fact that the binder does not swell, dissolve or disintegrate in the presence of oils and organic solvents, naturally increases the range of application of the composition. In this connection the bond is not affected by low temperatures and is resistant to elevated temperatures, e. g., up to substantially 212° F.

In addition to using "Thiokol" as the binder, I have also found quite satisfactory a so-called "Thiokol Cement." This product is prepared by producing a solution of "Thiokol" in chlorinated solvents in accordance with the patents of The Thiokol Corporation, of Yardville, New Jersey, which company manufactures and sells the cement product. Of course, other solvents besides chlorinated solvents are useful for preparing a satisfactory cement.

I have found that by using cement, I am able to incorporate a much higher percentage of cork with Thiokol. For example, I have made a very satisfactory cork composition consisting of five parts cork by volume to one part of Thiokol cement by volume.

The cement and comminuted cork are mixed together in the preparation of the cork composition and the solvent is evaporated, preferably by heating, but in some cases a volatile solvent not requiring heat is satisfactory. Thereafter the plastic cork composition having the binder or cement coated upon the cork particles, is pressed into a mold and vulcanized in the usual manner. Suitable accelerators and vulcanizing agents are employed in sufficient amount to promote the proper curing of the cement and if desired, in addition, stearic acid, zinc oxide, and gas black or equivalent materials may be employed. The resultant composition has approximately 15% Thiokol and 85% cork.

The cork composition of this invention with any of the binders described, has very excellent utility as an expansion joint and may also be used as a sealing liner generally, for example with closure caps of the crown, screw, or lug type.

I claim:

1. A gasket comprising a body material of comminuted cork, and a binder therefor comprising an olefin polysulphide reaction product in vulcanized condition, said cork being present in dominant amount by volume.

2. A gasket comprising a body material of comminuted cork, and a binder therefor comprising rubber and an olefin polysulphide reaction product in vulcanized condition, said cord being present in dominant amount by volume.

HARRY B. DENMAN.